Nov. 29, 1960        T. W. BERWIN ET AL        2,962,625
OSCILLOGRAPH DEFLECTION CIRCUIT
Filed Oct. 6, 1958                               2 Sheets-Sheet 1

TEDDY W. BERWIN
FREDERICK F. LIU
        INVENTORS

BY Edward M<sup>c</sup>Kendrick
                ATTORNEY

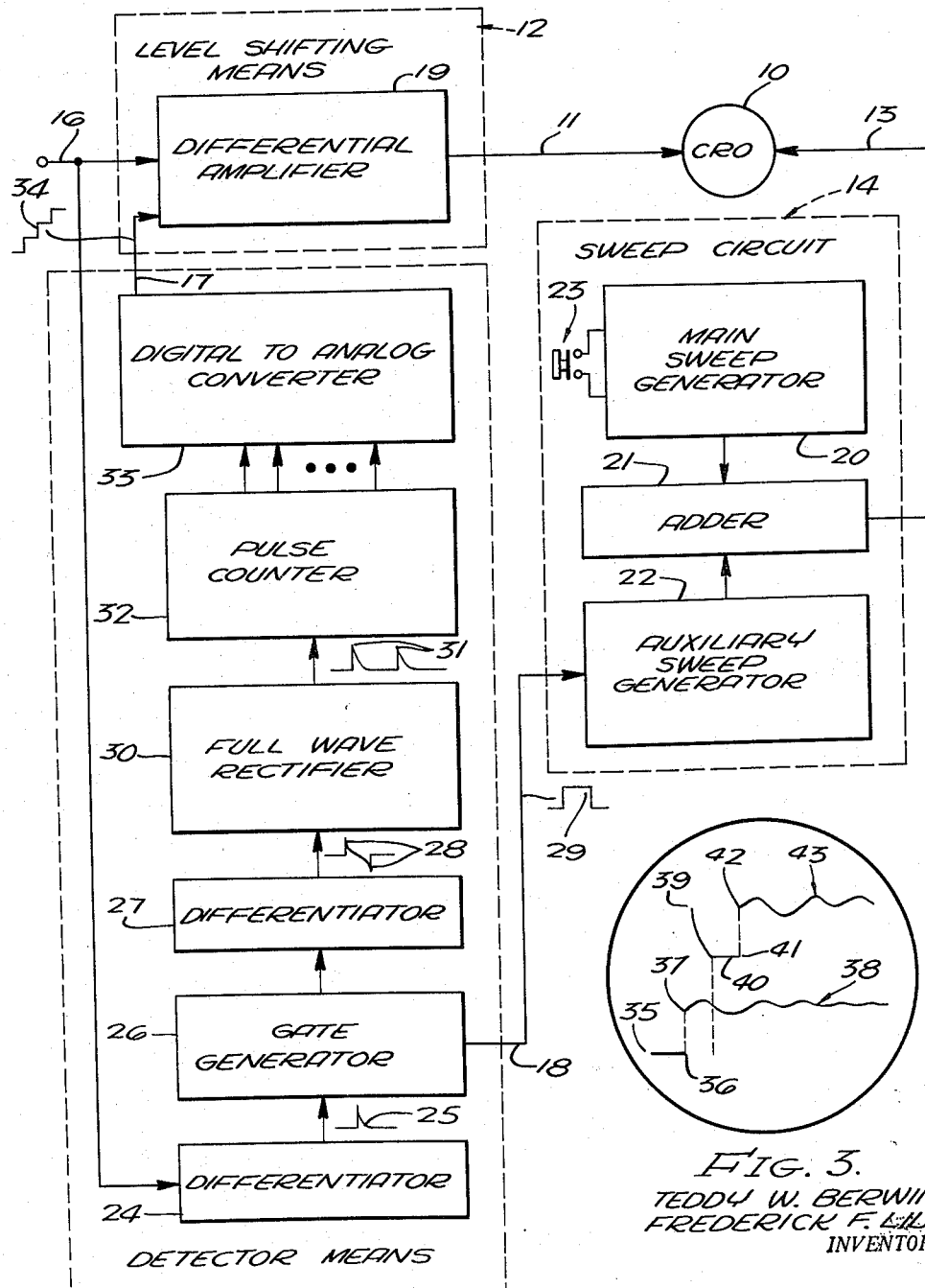

United States Patent Office 2,962,625
Patented Nov. 29, 1960

2,962,625

OSCILLOGRAPH DEFLECTION CIRCUIT

Teddy W. Berwin, Encino, and Frederick F. Liu, Northridge, Calif., assignors to Dresser Industries, Inc., Dallas, Tex., a corporation of Delaware Filed Oct. 6, 1958, Ser. No. 765,531

6 Claims. (Cl. 315—26)

This invention relates to recorders and the like, and more particularly to means for sweeping the beam of an oscillograph.

At the present time, the cathode-ray oscillograph with electrostatic deflection plates is generally the most popular of all oscillographs used. The invention may be used with any kind of oscillograph including the conventional cathode-ray oscillograph. Such oscillographs usually are provided with internal sawtooth sweep generators which sweep the cathode ray of a cathode-ray tube horizontally across a luminescent screen and a transient input signal is applied to vertical electrostatic deflection plates so that the input may be observed as a linear function of time. If a permanent record is desired, a photograph of the cathode-ray trace on the luminescent screen is taken.

In the testing of some equipment, the time at which a disturbance will start cannot be accurately predicted. This is especially true of rocket motors where the occurrence of transient reactions cannot be accurately estimated.

Thus, if an electrical instrument is employed to impress a signal on the vertical deflection plates of the cathode-ray tube proportional to an operating characteristic of such unpredictable equipment, the horizontal sweep of the oscillograph must be started before the equipment is operated. This means that the horizontal sweep speed of the oscillograph must be unusually slow to record all transients in a given period of operation and that small transients are almost indiscernible: That is, transients that vary extremely rapidly will be represented simply as a large illuminated spot on the oscillograph luminescent screen.

The present invention overcomes the above-described and other disadvantages of the prior art by providing a sweep circuit for impressing a deflection signal having a predetermined rate of change on an oscillograph, a level shifting device responsive to an input signal for impressing an output signal on the oscillograph, and detector means responsive to the input signal for impressing a first signal on the level shifting device to shift the level of the output signal thereof from the level of the input signal to a different level and for impressing a second signal on the sweep circuit to increase the rate of change of the first deflection signal for a selected length of time.

Thus, if the detector means is a threshold device operating when the input signal exceeds a predetermined amplitude or rate of change, a rapidly occurring transient signal may be traced at an increased sweep speed at a different vertical level on the oscillograph screen and be more accurately examined as to its nature.

In accordance with a feature of the invention, an electronic counter is employed to store or "remember" to which level the last transient was shifted so that a subsequent one will be traced at still a different height on the oscillograph luminescent screen and thereby eliminate any possibility of tracing over a prior recorded transient.

The above-described and advantages of the invention will be better understood when considered in connection with the following description.

In the accompanying drawings, which are to be regarded as merely illustrative:

Fig. 2 is a more detailed block diagram of one embodiment of the invention employing detector means which include a differentiator to operate the sweep circuit in response to an input signal having a rate of change above a predetermined threshold level;

Fig. 3 is a diagrammatic view of the face of a cathode-ray tube employing the sweep circuit shown in Fig. 2 with traces illustrating the function of the sweep circuit;

Figure 1:
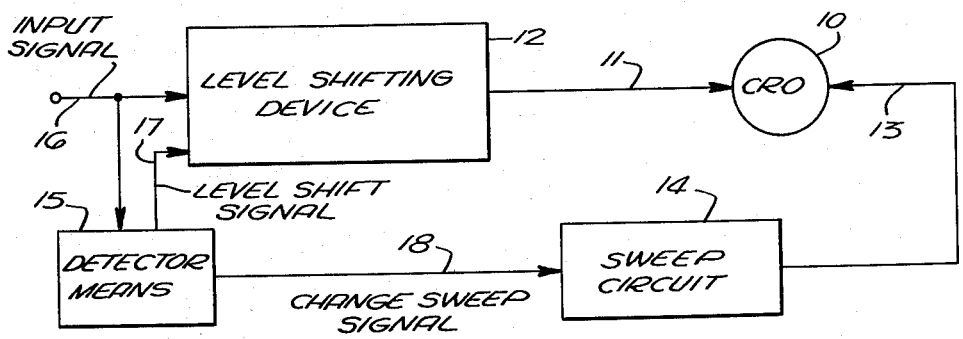
Fig. 1 is a block diagram of the circuit of the invention.

In Fig. 1, a cathode-ray oscillograph is indicated at 10 having a vertical input at 11 from a level shifting device 12 and a horizontal input 13 from a sweep circuit 14. Both level shifting device 12 and sweep circuit 14 are operated by detector means 15. Detector means 15 is responsive to an input signal on an input lead 16 to impress a level shift signal on level shifting device 12 via an electrical lead 17 and a change sweep signal on a sweep circuit 14 via an electrical lead 18.

Detector means 15, either responsive to the increase of the rate of change of the input signal beyond a predetermined threshold value or to the increase of the amplitude of the input signal beyond a predetermined threshold value, impresses the level shift signal on level shifting device 12 and change sweep signal 18 on sweep circuit 14. Level shifting device simply shifts the input signal positively or negatively and impresses a composite signal on electrical lead 11 to cathode-ray oscillograph 10. Although not necessarily, level shifting device 12 will ordinarily shift the amplitude of the input signal to either a higher or lower level in a staircase fashion to make traces for rapidly occurring transients at successively different heights on the face of the oscillograph 10. Change sweep signal 18 simply causes sweep circuit 14 to increase horizontal sweep speed of the cathode-ray of the tube 10. This can be done at the instantaneous position of the cathode ray at the instant the change sweep signal is generated or sweep circuit 14 may be operated to retrace back to the beginning of the sweep to have more room to trace a transient if it lasts for a longer period of time.

One specific embodiment of the invention is shown in Fig. 2 wherein level shifting means 12 includes simply a differential amplifier 19 and sweep circuit 14 includes a main sweep generator 20 and adder 21 and an auxiliary sweep generator 22. The output of differential amplifier 19 is impressed upon cathode-ray oscillograph 10 via lead 11 as before. Inputs to differential amplifier 19 arrive on input lead 16 and output lead 17 from detector means 15. Main sweep generator 20 may be initiated by any convenient means automatically or manually such as by means of the momentary contact push button 23 shown in Fig. 2.

Adder 21 adds the output of main sweep generator 20 to the output of auxiliary sweep generator 22. The change sweep signal produced by detector means 15 is impressed on auxiliary sweep generator 22.

Detector means 15 receives an input signal from lead 16 which is impressed upon a differentiator 24. The output of differentiator 24 indicated at 25 is impressed upon a gate generator 26. The output of gate generator 26 is impressed on both auxiliary sweep generator 22 and a differentiator 27 which is employed to produce output signals 28 determining the beginning and end of a gate 29 shown at the output of gate generator 26 adjacent lead 18. Pulses 28 are passed through a full wave rectifier 30 in detector means 15 to produce positive output pulses 31 which are impressed upon a digital counter 32 in detector means 15 to count the number of output pulses of full wave rectifier 30. The output of pulse counter 32 is impressed upon a digital-to-analog converter 33 which in turn impresses a staircase voltage indicated at 34 on lead 17 at the input of differential amplifier 19. Hence, staircase voltage 34 is effectively added or subtracted from the input signal appearing on input lead 16 and the sum or difference of these, depending upon the sign of the staircase voltage, is impressed upon cathode-ray oscillograph 10 via lead 11 as stated previously.

In the operation of the embodiment of the invention shown in Fig. 2, when the rate of change of the input signal on lead 16 exceeds a selected value, differentiator 24 produces output pulse 25 which is impressed upon gate generator to produce gate 29. Gate 29 operates auxiliary sweep 22 which adds a sweep voltage to the sweep voltage of main sweep generator 20 and increases the rate of change of the output voltage impressed upon cathode-ray oscillograph 10 via lead 13 because the outputs of both sweep generators 20 and 22 are added together in adder 21, the output of which is connected to the horizontal deflection means of cathode-ray oscillograph 10 via lead 13.

At the same time, gate 29 is impressed upon differentiator 27 and the first of the pulses 28 are passed by full wave rectifier 30 to counter 32, the output of which is converted instantaneously by digital-to-analog converter 33 to a step function output signal which causes the output of differential amplifier 19 to increase or decrease still further to cause the fast trace to be made at a greater height on oscillograph 10 than the previous trace. At the end of gate 29, it is desirable to return to the slow sweep of main sweep generator 20 in which case auxiliary sweep generator 22 automatically retraces to zero. However, the output of main sweep generator 20 will remain at its current value and the cathode ray of oscillograph 10 will not be brought to its original position but to a position spaced from the position at the beginning of gate 29 since the output of main sweep generator 20 increases during the interval of gate 29. The second of output pulses 28 of differentiator 27 and output pulses 31 of full wave rectifier 30 is employed to increase the count of counter 32 and therefore the staircase level output of digital-to-analog converter 33 in order to start a slow trace at still a greater height on the face of oscillograph 10.

Automatic blanking and retrace may be employed for the cathode ray of oscillograph 10 for retrace periods of either main sweep generator 20 or auxiliary sweep generator 22. Automatic retrace for main sweep generator 20 at the end of gate 29 may also be provided. Still further, auxiliary sweep generator 22 may be used alternately with main sweep generator 20 or may be used in conjunction with it to start a trace not at a position dependent upon the time interval at which a transient occurs during the sweep of main sweep generator 20, but at the beginning of a sweep. This may be done by incorporating exactly the same equipment shown in Fig. 2 or by incorporating equipment to disable main sweep generator 20 during operation of auxiliary sweep generator 22.

All the equipment shown in Fig. 2 may be of a conventional type, all the components shown being entirely conventional circuits of the prior art when taken individually. Pulse counter 32 may reset itself to zero after a predetermined number of gates 20 or 29. The number of pulses it will be designed to count will depend upon the selected spacing or output signal step levels of staircase voltage 34 as compared to the deflection constant of cathode-ray oscillograph 10 and the height of a luminescent screen employed therewith if such is the case.

A typical trace on the luminescent screen of cathode-ray tube 10 is shown in Fig. 3 for the circuitry shown in Fig. 2. It is to be noted that the trace initiates in time at point 35 and continues substantially uninterruptedly to point 36. At this point differentiator 24 detects a signal having a rather large rate of change and automatically the cathode ray of tube 10 is shifted to point 37 and a trace 38 is made toward the right side of the screen of the tube 10 at a sweep speed substantially greater than that during which the cathode ray moves from point 35 to point 36. At the end of the sweep of curve 38, the cathode ray of tube 10 automatically returns to the point 39 which is spaced from the point 36 along the horizontal a distance proportional to the sweep time of main sweep generator 20 during gate 29. Thus, the cathode ray at 39 is again swept at a slow speed along curve 40 to point 41 at which point it is stepped up to a still higher level at point 42 and transient curve 43 is traced at a greater horizontal sweep speed since auxiliary sweep generator 22 is again actuated.

Figure 4:
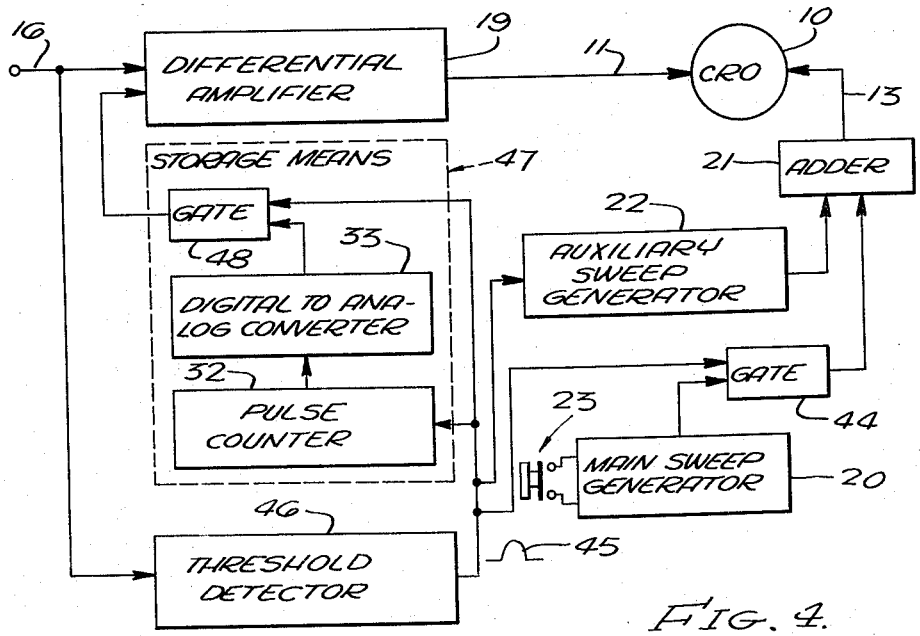
Fig. 4 is a block diagram of still another embodiment of the invention.

An alternative embodiment of the invention is shown in Fig. 4 where many of the circuit components of Fig. 2 are employed. Circuit components including differential amplifier 19 and its connection with input lead 16 and cathode-ray oscillograph 10 may be employed in exactly the same manner and main sweep generator 20, auxiliary sweep generator 22, and adder 21 may also be employed. Main sweep generator 20 is connected in a slightly different manner to adder 21 through a normally open gate 44 which is used as a blanking gate based on reception of the pulse 45 from a threshold detector 46. Threshold detector produces pulse 45 when the amplitude of an input signal on lead 16 exceeds a predetermined or selected value. Pulse 45 is also impressed upon auxiliary sweep generator to operate it as before. Also included in the diagram of Fig. 4 is storage means 47 which includes pulse counter 32 and digital-to-analog converter 33 which may be identical with that used previously but wherein a normally closed gate 48 is also employed to impress the output signal of digital-to-analog converter 33 on differential amplifier 19 only during the application of pulse 45 to gate 48.

Main sweep generator 20 is started by pressing push button 23 as before. Gate 44 is normally opened and therefore the output of gate 44 is impressed upon cathode ray oscillograph 10 through adder 21, the output of auxiliary sweep generator 22 being zero except during the application of pulse 45. When input signal 16 exceeds a predetermined level, pulse 45 is produced by threshold detector 46 and is impressed upon sweep generator 22. This causes the beam of cathode-ray oscillograph 10 to retrace to the beginning and to start sweeping at a more rapid rate proportional to the rate of change of the output of auxiliary sweep generator 22. In this case, the output of main sweep generator 20 to adder 21 is suppressed by gate 44 because gate 44 is normally open and is closed by the application of pulse 45, thereby preventing the output of main sweep generator 20 from being impressed upon adder 21. At the same time pulse 45 is impressed upon gate 44 and on auxiliary sweep generator 22, it is also impressed upon pulse counter 32 to increase the count thereof and therefore to increase the step wave output of digital-to-analog converter 33 which is impressed upon differential amplifier 19 during the period of pulse 45 by the application of it to gate 48 to permit the output of digital-to-analog converter 33 to pass through it and thereby be impressed upon differential amplifier 19. The output of gate 48 is added to an input signal appearing on input lead 16 as before. Since gate 48 opens only during the period of pulse 45, although due to the operation of pulse counter 32 each succeeding time gate 45 is generated input signal appearing on lead 16 is increased or decreased by a succeedingly larger positive or negative output of digital-to-analog converter 33, during the period when pulses 45 are not generated, input signal 16 is passed directly by differential amplifier 19 and a slow trace on cathode-ray tube 10 is maintained by main sweep generator 20 on the same line, i.e., at the same height or level on the luminescent screen of the tube 10.

Figure 5:
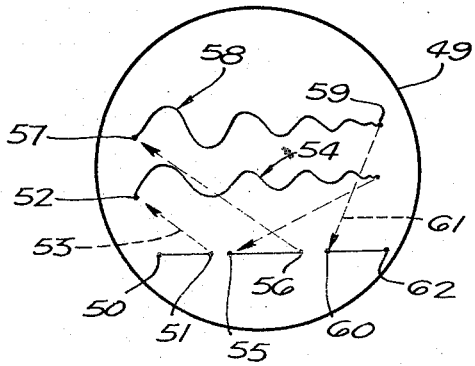
Fig. 5 is a diagrammatic view of traces which may be made with the sweep circuit shown in the embodiment of Fig. 4.

The operation of the embodiment of the invention shown in Fig. 4 may be better understood and considered in connection with the representative traces made by the cathode ray of the tube 10 on the luminescent screen thereof as indicated at 49 in Fig. 5. The initial trace starts at 50 and at a point 51 jumps to a point 52 as indicated by dotted arrow 53. This is when auxiliary sweep generator 22 takes over and traces a rapidly varying transient curve indicated at 54. At the end of the trace 54, the cathode ray of tube 10 jumps back to a point 55 and continues along the slow trace at the same level to point 56 when another pulse 45 is generated. In this case, the cathode ray of tube 10 jumps to point 57 and traces curves 58 to a point 59 and then jumps back to a point 60 as indicated by dotted arrow 61 as before. The cathode ray of tube 10 then continues to point 62 on the slow trace or lowest level, there being no further rapidly varying transients indicated by the generation of any further pulses 45 at the output of threshold detector 46.

Although two specific embodiments of the invention have been illustrated and described, it is to be understood that still other features may be incorporated in the invention without departing therefrom. Still further, features of the embodiment shown in Fig. 2 may be incorporated in the embodiment shown in Fig. 4, and vice versa. For example, of course the cathode ray of a tube may be swept vertically rather than horizontally as indicated in Figs. 3 and 5 simply by reversing the leads 11 and 13 shown in Figs. 2 and 4 so that lead 13 will provide a vertical input and lead 11 will provide a horizontal input. Still further, as shown in Figs. 3 and 5, transient curves 38, 43, 54 and 58 may be stepped vertically upwardly or alternatively may be stepped vertically downwardly. Still further, the slow sweep between points 50 and 51, 55 and 56, and 60 and 62, shown in Fig. 5 may be produced on the same line as there indicated or on different lines as indicated in Fig. 3 between points 35 and 36, and 39 and 41.

Still another modification of the invention might be the transposition of circuitry to cause curve 38 to be drawn on the same line as that in which points 35 and 36 lie. In this case, straight line 40 shown in Fig. 3 may be drawn on the same line as curve 43. Still further, it is to be noted that the rapidly varying transients 54 and 58 may start at the same point on the left side of face 49 of tube 10 or they may start in timed relation as indicated in Fig. 3 with respect to the slow traces between points 35 and 36, and 39 and 41. Still further, it is not necessary to employ a sweep generator 22 but a variable slope main sweep generator 20 may also be employed.

Many other changes and modifications of the invention will suggest themselves to those skilled in the art. Any other and the ones above may be used in any combination together and the invention still practices. Thus, it is to be expressly understood that the invention is by no means limited to the specific embodiments illustrated and described, the true scope of the invention being defined only in the appended claims.

What is claimed is:

1. In an oscillograph device, the combination comprising: a sweep circuit for impressing a deflection signal having a predetermined rate of change on said oscillograph; first means responsive to an input signal for impressing an output signal on said oscillograph; second means responsive to the rate of change of said input signal and for impressing a first signal on said first means to shift the level of said output signal thereof from the level of said input signal to a different level and for impressing a second signal on said sweep circuit to increase the rate of change of said deflection signal for a selected length of time when the rate of change of said input signal exceeds a predetermined value.

2. In an oscillograph device, the combination comprising: a variable sweep circuit for impressing a first deflection signal on said oscillograph; a differentiator responsive to an input signal for impressing a change sweep signal on said sweep circuit to increase the rate of change of said first deflection signal for a selected length of time; means to store the total number of change state signals produced by said differentiator; and means responsive to the output of said storage means for impressing a deflection signal on said oscillograph of a different magnitude each time said change state signals are produced, said deflection signal being proportional to the sum of a staircase signal proportional to the number of said change state signals produced by said differentiator plus the amplitude of said input signal.

3. In an oscillograph device, the combination comprising: a variable sweep circuit for impressing a first deflection signal on said oscillograph; a differentiator responsive to an input signal for impressing a change sweep signal on said sweep circuit to increase the rate of change of said first deflection signal for a selected length of time; means to count the change state signals produced by said differentiator; a digital-to-analog converter for producing an output signal proportional to the total number of said change state signals produced by said differentiator; and a differential amplifier for impressing a second deflection signal on said oscillograph proportional to the sum of said input signal and the output signal of said digital-to-analog converter at least for a portion of said selected length of time.

4. In an oscillograph device, the combination comprising: a variable sweep circuit for impressing a first deflection signal on said oscillograph; a differentiator responsive to an input signal for impressing a change sweep signal on said sweep circuit to increase the rate of change of said first deflection signal for a selected length of time; first means for producing a level-shift signal having an amplitude greater than zero each time the rate of change of said first deflection signal is increased; and second means for impressing a second deflection signal on said oscillograph proportional to the sum of said input signal and the output signal of said first means at least for a portion of said selected length of time.

5. In an oscillograph device, the combination comprising: a variable sweep circuit for impressing a first deflection signal on said oscillograph; first means responsive to an input signal for impressing a change sweep signal on said sweep circuit to increase the rate of change of said first deflection signal for a selected length of time; second means to produce a pulse each time the rate of change of said first deflection signal is increased; third means to count said pulses; a digital-to-analog converter for producing an output signal proportional to the total number of said pulses produced by said second means; and fourth means for impressing a second deflection signal on said oscillograph proportional to the sum of the input signal and the output signal of said digital-to-analog converter at least for a portion of said selected length of time.

6. In an oscillograph device, the combination comprising: a variable sweep circuit for impressing a first deflection signal on said oscillograph; a differentiator responsive to an input signal for impressing a change sweep signal on said sweep circuit to increase the rate of change of said first deflection signal for a selected length of time; means to count the change state signals produced by said differentiator; a digital-to-analog converter for producing an output signal proportional to the total number of said change state signals produced by said differentiator; and means for impressing a second deflection signal on said oscillograph proportional to the sum of said input signal and the output signal of said digital-to-analog converter at least for a portion of said selected length of time.

References Cited in the file of this patent

UNITED STATES PATENTS

| | | |
|---|---|---|
| 2,368,448 | Cook | Jan. 30, 1945 |
| 2,378,383 | Arndt | June 19, 1945 |
| 2,426,201 | Grieg | Aug. 26, 1947 |
| 2,484,618 | Fisher | Oct. 11, 1949 |
| 2,577,758 | Hastings | Dec. 11, 1951 |
| 2,871,404 | Mugele | Jan. 27, 1959 |